United States Patent
Kim et al.

(10) Patent No.: US 11,454,741 B2
(45) Date of Patent: Sep. 27, 2022

(54) OPTICAL DISPLAY DEVICE PROTECTING FILM, OPTICAL MEMBER COMPRISING SAME, AND OPTICAL DISPLAY DEVICE COMPRISING SAME

(71) Applicant: SAMSUNG SDI CO., LTD., Yongin-si (KR)

(72) Inventors: Do Young Kim, Suwon-si (KR); Young Hoon Kim, Suwon-si (KR); Tae Ji Kim, Suwon-si (KR); Dong Myeong Shin, Suwon-si (KR); Oh Hyun Hwang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/324,873

(22) PCT Filed: Aug. 2, 2017

(86) PCT No.: PCT/KR2017/008324
§ 371 (c)(1),
(2) Date: Feb. 11, 2019

(87) PCT Pub. No.: WO2018/030701
PCT Pub. Date: Feb. 15, 2018

(65) Prior Publication Data
US 2019/0169388 A1    Jun. 6, 2019

(30) Foreign Application Priority Data

Aug. 11, 2016  (KR) .................. 10-2016-0102618
Sep. 27, 2016  (KR) .................. 10-2016-0124314

(51) Int. Cl.
*G02B 1/04*        (2006.01)
*G02B 1/14*        (2015.01)
(Continued)

(52) U.S. Cl.
CPC ............... *G02B 1/04* (2013.01); *C08J 7/043* (2020.01); *C08J 7/046* (2020.01); *C08L 75/16* (2013.01);
(Continued)

(58) Field of Classification Search
CPC ........ C08J 7/04; C08J 7/0427; C08J 2483/12; C08J 2475/15; C08J 2375/04;
(Continued)

(56) References Cited

U.S. PATENT DOCUMENTS

2009/0004478 A1*  1/2009  Baetzold .................. C09J 7/29
                                                   428/412
2014/0220264 A1*  8/2014  Park ...................... C08G 18/792
                                                   428/1.55
(Continued)

FOREIGN PATENT DOCUMENTS

JP        2003-4939 A      1/2003
JP        2014-24332 A     2/2014
(Continued)

OTHER PUBLICATIONS

Korean Office action in corresponding Korean application 10-2016-0102618, Korean Office action dated Jan. 21, 2019 (5 pgs.).
(Continued)

*Primary Examiner* — Nancy R Johnson
(74) *Attorney, Agent, or Firm* — Lewis Roca Rothgerber Christie LLP

(57) ABSTRACT

Provided are an optical display device protecting film and an optical display device comprising the same, the optical display device protecting film comprising: a first substrate layer; and a hard coating layer formed on the first substrate layer, wherein the substrate layer is made of a thermoplastic
(Continued)

polyurethane film, and the first substrate layer has a thickness of 100 μm to 200 μm and has a Shore hardness of 95 A to 98 A.

20 Claims, 2 Drawing Sheets

(51) Int. Cl.
*C09D 133/10* (2006.01)
*C08L 75/16* (2006.01)
*C09D 175/16* (2006.01)
*C08L 75/06* (2006.01)
*C08K 3/22* (2006.01)
*C08J 7/043* (2020.01)
*C08J 7/046* (2020.01)
*C09D 133/12* (2006.01)
*G02B 6/32* (2006.01)
*G02B 6/26* (2006.01)

(52) U.S. Cl.
CPC ......... *C09D 133/10* (2013.01); *C09D 133/12* (2013.01); *C09D 175/16* (2013.01); *G02B 1/14* (2015.01); C08K 2003/2244 (2013.01); C08L 75/06 (2013.01); G02B 6/26 (2013.01); *G02B 6/32* (2013.01)

(58) Field of Classification Search
CPC .. C09D 133/10; C09D 175/16; C09D 133/12; G02B 6/32; G02B 6/26; G02B 1/04; G02B 1/14; C08L 75/16; C08L 75/06; C08K 2003/2244

See application file for complete search history.

(56) References Cited

U.S. PATENT DOCUMENTS

2017/0335136 A1\* 11/2017 Lee .......................... C08K 3/36
2019/0308398 A1\* 10/2019 Junghans ................... C09J 7/29

FOREIGN PATENT DOCUMENTS

| JP | 2014-25061 A | 2/2014 |
| KR | 10-2007-0105869 A | 10/2007 |
| KR | 10-2009-0110662 A | 10/2009 |
| KR | 10-2010-0055160 A | 5/2010 |
| KR | 10-2015-0070359 A | 6/2015 |
| KR | 10-2016-0024003 A | 3/2016 |
| KR | 10-2016-0034463 A | 3/2016 |
| WO | WO 2016/018749 A1 | 2/2016 |

OTHER PUBLICATIONS

International Search Report of corresponding PCT/KR2017/008324, dated Nov. 10, 2017, 4 pages.
"Color communications technology trend," Fiber Technology and Industry, vol. 9, No. 4, 2005, pp. 327-340, p. 331 in English.

\* cited by examiner

[Figure 1]
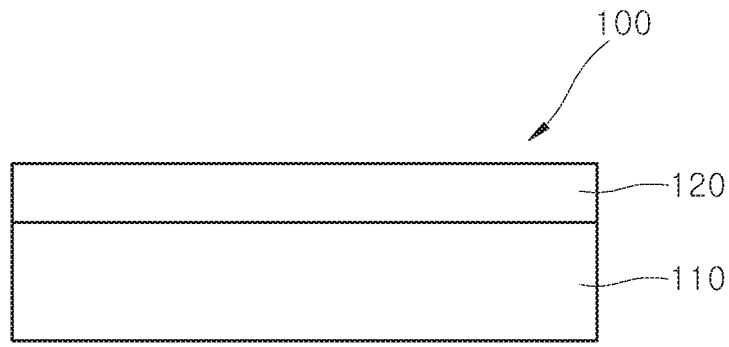
[Figure 2]
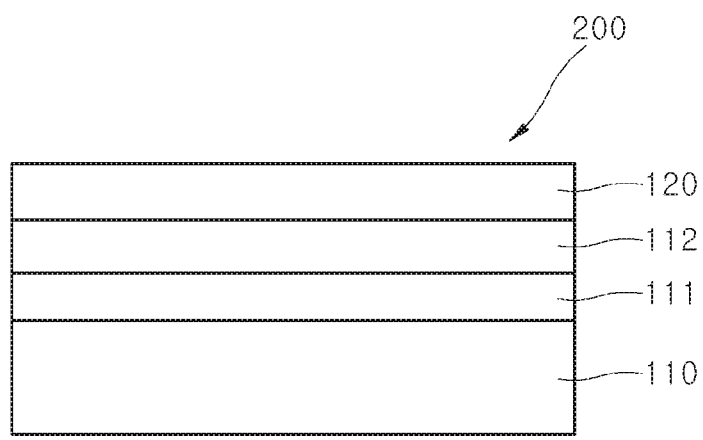
[Figure 3]
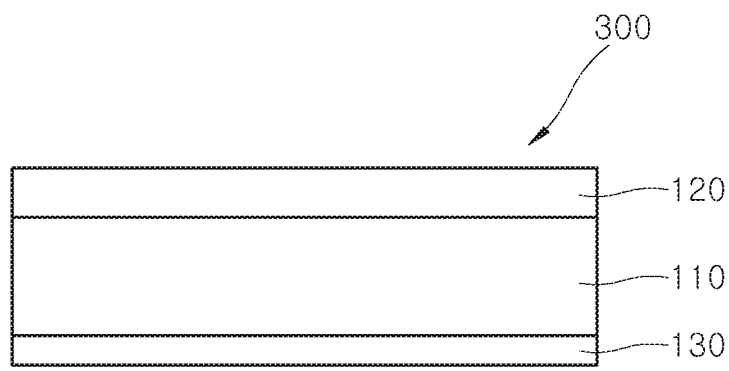

【Figure 4】
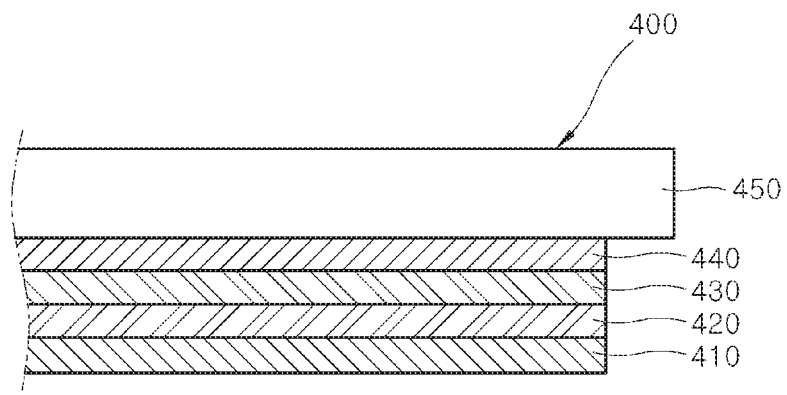
【Figure 5】
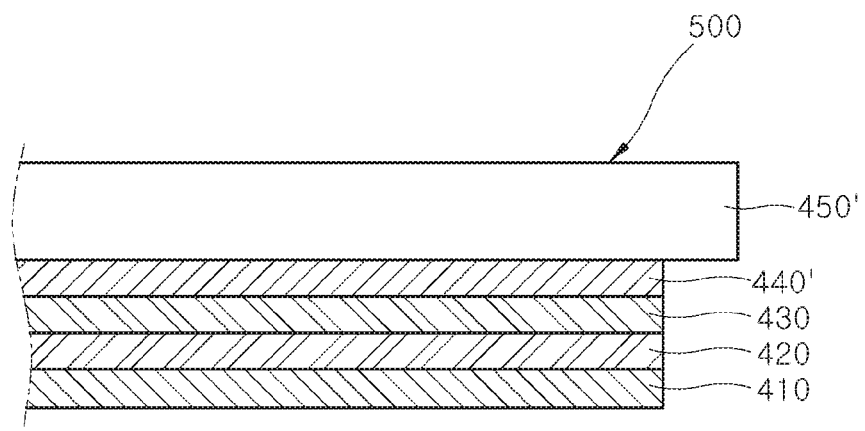

OPTICAL DISPLAY DEVICE PROTECTING FILM, OPTICAL MEMBER COMPRISING SAME, AND OPTICAL DISPLAY DEVICE COMPRISING SAME

CROSS-REFERENCE TO RELATED APPLICATIONS

This application is a National Phase Patent Application and claims priority to and the benefit of International Application Number PCT/KR2017/008324, filed on Aug. 2, 2017, which claims priority to and the benefit of Korean Patent Application Nos. KR 10-2016-0102618, filed on Aug. 11, 2016 and KR 10-2016-0124314, filed on Sep. 27, 2016, the entire contents of each of which are incorporated herein by reference.

FIELD

The present invention relates to a protective film for optical displays, an optical member including the same, and an optical display including the same.

BACKGROUND

Currently, a protective film for protecting a foldable optical display from an external environment has been developed with the development of foldable optical displays. For example, a protective film for optical displays may include a window film disposed on an outer surface of an optical display to allow a display image to be viewed therethrough by a user or a protective film for window films disposed on the window film to protect the window film. In particular, a typical protective film for window films requires, more than any other properties, protection from an external environment and reworkability, but fails to realize folding properties and cannot be applied to a foldable optical display.

Generally, protection from an external environment can be realized through improvement in curing density or curing degree and formation of a hard film through combination of resins having a rigid structure and organic/inorganic particles. Contrary, folding properties can be realized through reduction in curing density and formation of a smooth film through crosslinking with a resin having good flexibility.

The background technique of the present invention is disclosed in Korean Patent Laid-open Publication No. 2010-0055160.

SUMMARY

It is one object of the present invention to provide a protective film for optical displays, which exhibits good properties in terms of foldability, flexibility, scratch resistance, and impact resistance.

It is another object of the present invention to provide a protective film for optical displays, which exhibits good properties in terms of scratch resistance and impact resistance on a thin coating layer.

It is a further object of the present invention to provide a protective film for optical displays, which exhibits good light resistance reliability.

In accordance with one aspect of the present invention, a protective film for optical displays includes: a first base layer; and a hard coating layer formed on the first base layer, wherein the first base layer is formed of a thermoplastic polyurethane and the first base layer has a thickness of 100 μm to 200 μm and a Shore hardness of 95 A to 98 A.

In accordance with another aspect of the present invention, a protective film for optical displays includes: a first base layer; and a hard coating layer formed on the first base layer, wherein the hard coating layer is formed of a hard coating composition including first urethane (meth)acrylate oligomer, second urethane (meth)acrylate oligomer, a (meth)acrylate monomer, zirconia particles, an initiator, a silicon-based additive, and a fluorine-based additive, the first urethane (meth)acrylate oligomer has different elongation from the second urethane (meth)acrylate oligomer, the first urethane (meth)acrylate oligomer is present in an amount of about 10 parts by weight to about 50 parts by weight and the second urethane (meth)acrylate oligomer is present in an amount of about 40 parts by weight to about 80 parts by weight, of the total amount of 100 parts by weights of the first urethane (meth)acrylate oligomer, the second urethane (meth)acrylate oligomer, the (meth)acrylate monomer, and the zirconia particles.

In accordance with a further aspect of the present invention, an optical member may include the protective film for optical displays according to the present invention.

In accordance with yet another aspect of the present invention, an optical display may include the protective film for optical displays according to the present invention.

It is one object of the present invention to provide a protective film for optical displays, which exhibits good properties in terms of foldability, flexibility, scratch resistance, and impact resistance.

It is another object of the present invention to provide a protective film for optical displays, which exhibits good properties in terms of scratch resistance and impact resistance on a thin coating layer.

It is a further object of the present invention to provide a protective film for optical displays, which exhibits good light resistance reliability.

BRIEF DESCRIPTION OF THE DRAWINGS

FIG. 1 is a cross-sectional view of a protective film for optical displays according to one embodiment of the present invention.

FIG. 2 is a cross-sectional view of a protective film for optical displays according to another embodiment of the present invention.

FIG. 3 is a cross-sectional view of a protective film for optical displays according to a further embodiment of the present invention.

FIG. 4 is a cross-sectional view of an optical display according to one embodiment of the present invention.

FIG. 5 is a cross-sectional view of an optical display according to another embodiment of the present invention.

DETAILED DESCRIPTION

Embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that the term "upper surface" can be used interchangeably with the term "lower surface", and when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, the term "(meth)acryl" refers to acryl and/or methacryl.

Herein, "Shore hardness" refers to a value measured using a Shore hardness meter in accordance with JIS K7311.

Herein, "elongation" refers to a value measured by an Instron testing method in accordance with JIS K7311.

Herein, the average particle diameter of organic nanoparticles is the particle diameter of the organic nanoparticles measured in a water-based or organic solvent using a Zetasizer nano-ZS of Malvern Co., and represented by a Z-average value, as confirmed by SEM/TEM observation.

Herein, "indentation modulus" or "indentation hardness" of a protective film is measured by applying a force of 10 mN to a portion (unit area: 1 mm$^2$) of a hard coating layer in the protective film (thickness of first base layer: 150 μm, thickness of hard coating layer: 5 μm) using a nano-indentor (Vickers indenter) of a nano-indentation instrument under conditions of 25° C. and 55% RH (relative humidity) for 5 seconds, followed by creeping for 2 seconds and relaxation for 5 seconds. The nano-indentation instrument may be a TI750 Ubi (Hysitron Co., Ltd.), but is not limited thereto.

Herein, "in-plane retardation (Re)" is a value measured at a wavelength of 550 nm and is represented by Equation 3:

$$Re = (nx - ny) \times d \qquad \text{<Equation 3>}$$

(wherein nx and ny are the indices of refraction in the slow and fast axis directions of a base layer at a wavelength of 550 nm, respectively, and d is the thickness of the base layer (unit: nm)).

Herein, the term "protective film for optical displays" may include a window film disposed on an outer surface of an optical display to allow a display image to be viewed therethrough by a user and/or a protective film for window films disposed on the window film to protect the window film.

Now, a protective film for optical displays (hereinafter, referred to as "protective film") according to one embodiment of the present invention will be described with reference to FIG. 1. FIG. 1 is a cross-sectional view of a protective film for optical displays according to one embodiment of the present invention.

Referring to FIG. 1, a protective film 100 may include a first base layer 110 and a hard coating layer 120.

The first base layer 110 can support the hard coating layer 120 while protecting the hard coating layer 120.

The first base layer 110 may have a thickness of 100 μm or more to 200 μm or less and has a Shore hardness of 95 A to 98 A, and may be formed of a thermoplastic polyurethane (TPU). Within these ranges of thickness and Shore hardness, the first base layer can reduce the radius of curvature of the protective film in cooperation with the hard coating layer 120 to improve flexibility of the protective film such that the protective film can be used in a foldable optical display, can achieve thickness reduction of the protective film, and can improve impact resistance and scratch resistance to prevent damage to an OLED panel even when the hard coating layer 120 has a thin thickness of, for example, 3 μm or more to less than 20 μm, specifically 3 μm or more to 15 μm or less.

In addition, even when an adhesive layer described below is formed thereon, the first base layer 110 can maintain impact resistance and scratch resistance of the protective film. In general, when the adhesive layer is stacked on a lower surface of the first base layer, impact resistance and scratch resistance of the protective film can be reduced, as compared with the case where the protective film does not have the adhesive layer. Further, the first base layer 110 can prevent the base layer from peeling off of the adhesive layer upon folding and can improve foldability.

The first base layer 110 may be provided in the form of a coating layer or film and may be formed of the thermoplastic polyurethane alone or by further adding an additive for preventing yellowing, for example, a stabilizer, to the thermoplastic polyurethane.

The thermoplastic polyurethane may include any material that can satisfy the above Shore hardness within the thickness range of the first base layer. For example, the thermoplastic polyurethane can be derived from a bi- or higher functional polyol and a bi- or higher functional isocyanate and may further include a chain extender. The polyol may include an aromatic polyol, an aliphatic polyol, and an alicyclic polyol. Preferably, the polyol is a polyurethane formed of at least one of the aliphatic polyol and the alicyclic polyol. In this case, the protective film can suffer from less yellowing. The polyol may include at least one of a polyester diol, a polycarbonate diol, a polyolefin diol, a polyether diol, a polythioether diol, a polysiloxane diol, a polyacetal diol, and a polyester amide diol, without being limited thereto. The polyfunctional isocyanate may include any aliphatic, alicyclic or aromatic isocyanate. The chain extender may include a diol, for example, an aliphatic diol, an amino alcohol, a diamine, a hydrazine, a hydrazide, or a mixture thereof. The above Shore hardness of the thermoplastic polyurethane can be obtained by controlling polymerization time or the number of blocks in the polyfunctional isocyanate and/or the chain extender of the thermoplastic polyurethane. In preparation of the thermoplastic polyurethane, a tin compound, for example, a tin salt of carboxylic acid, and an amine compound, for example, dimethylcyclohexylamine or triethylene amine, may be further added as a catalyst for promoting formation of a urethane bond. In preparation of the thermoplastic polyurethane, other typical components, for example, a surfactant, a flame retardant, a filler, a pigment, and the like may be further added.

The first base layer 110 may have a yellow index YI of about 2.0 or less, for example, about 0.1 to about 1.5, and a color difference ΔE of about 3.0 or less, for example, about 0.1 or more to about 2.0 or less. Within this range, the first base layer can be used in the protective film and can provide light resistance reliability. The color difference ΔE can be defined by Equation 1:

$$\Delta E = [(\Delta L^*)^2 + (\Delta a^*)^2 + (\Delta b^*)^2]^{1/2} \qquad \text{<Equation 1>}$$

(In Equation 1, where $\Delta L^*$ is $(L^*)_2 - (L^*)_1$; $\Delta a^*$ is $(a^*)_2 - (a^*)_1$; $\Delta b^*$ is $(b^*)_2 - (b^*)_1$; $(L^*)_2$ is $L^*$ (brightness value) of the first base layer after measurement of light resistance reliability; $(L^*)_1$ is $L^*$ of the first base layer before measurement of light resistance reliability; $(a^*)_2$ is $a^*$ of the first base layer after measurement of light resistance reliability; $(a^*)_1$ is $a^*$ of the first base layer before measurement of light resistance reliability; and $(b^*)_2$ is $b^*$ of the first base layer after measurement of light resistance reliability; and $(b^*)_1$ is $b^*$ of the first base layer before measurement of light resistance reliability). Here, measurement of light resistance reliability means treatment of the first base layer after the first base layer is left for 72 hours under a UV-B light source.

L*, a*, and b* can be measured using a colorimeter (CM-3600d, Konica Minolta Co., Ltd.).

The first base layer 110 may have an index of refraction of about 1.40 to about 1.65, specifically about 1.45 to about 1.60. Within this range, the first base layer 110 can exhibit a suitable index of refraction relative to the hard coating layer, whereby the protective film can have good optical properties. In addition, when used as a protective film for window films, the protective film mounted on a window film can provide good visibility.

The first base layer 110 may have a total transmittance of about 85% to about 100%, specifically about 90% to about 99%, at a wavelength of 550 nm. Within this range, the protective film can be used in an optical display.

The first base layer 110 may be an optically isotropic film or a retardation film.

In one embodiment, the first base layer may be an isotropic film, which may have an in-plane retardation Re of about 5 nm or less, for example, about 0 nm to about 1 nm. The isotropic film allows the window film or various retardation films disposed under the window film to exhibit inherent functions thereof.

In another embodiment, the first base layer may be a retardation film, which may have an in-plane retardation Re of higher than about 5 nm, specifically about 50 nm to about 15,000 nm. The retardation film can have an optical compensation function to provide additional functions to an optical display while supporting the hard coating layer. For example, the first base layer may be, for example, a λ/4 retardation plate film (QWP film) having an in-plane-retardation Re of about 100 nm to about 160 nm. In this case, the first base layer can provide a polarization effect to sunglasses. For example, the first base layer may be, for example, a λ/2 retardation plate film (HWP film) having an in-plane-retardation Re of about 200 nm to about 300 nm. In this case, the first base layer may be stacked together with the λ/4 retardation plate film to provide a good display image. For example, the first base layer may be a super retardation film having an in-plane retardation of Re of about 8,000 nm or more, about 15,000 nm or more, or about 30,000 nm or less. As a result, the first base layer can suppress generation of rainbow mura or spots.

The first base layer 110 may be prepared by formation of a film through melt extrusion or solvent casting of a first base layer composition including the thermoplastic polyurethane alone or the thermoplastic polyurethane and additives. The prepared film is stretched to have a phase retardation function by a typical method.

The hard coating layer 120 is formed on the first base layer 110. The hard coating layer 120 can serve to protect various optical elements in an optical display or can be used as a protective film for window films to protect a window film and various elements disposed under the window film in the optical display.

The hard coating layer 120 may have a thickness of about 3 μm or more to less than about 20 μm, specifically 3 μm or more to 15 μm or less, and may be directly formed on the first base layer 110 to improve impact resistance and scratch resistance even when the protective film has a thin structure. Herein, the expression "directly formed" means that no adhesive/bonding layer or optical layer is formed between the first base layer 110 and the hard coating layer 120.

The hard coating layer 120 may have an index of refraction of about 1.40 to about 1.75, specifically about 1.45 to about 1.65. Within this range, the hard coating layer can exhibit a suitable index of refraction relative to the first base layer so as to secure good optical properties of the protective film, and can provide good screen visibility when the protective film is mounted on the window film. A difference in index of refraction between the hard coating layer 120 and the first base layer (the index of refraction of the first base layer—the index of refraction of the hard coating layer) may be about 0.3 or less, for example, about 0.01 to about 0.2. Within this range, the protective film can be used in an optical display.

The hard coating layer 120 may be formed of a hard coating composition that includes a first urethane (meth)acrylate oligomer, a second urethane (meth)acrylate oligomer, a (meth)acrylate monomer, zirconia particles, an initiator, a silicon-based additive, and a fluorine-based additive. In terms of solid content, the first urethane (meth)acrylate oligomer may be present in an amount of about 10 parts by weight to about 50 parts by weight and the second urethane (meth)acrylate oligomer may be present in an amount of about 40 parts by weight to about 80 parts by weight, of the total amount of 100 parts by weight of the first urethane (meth)acrylate oligomer, the second urethane (meth)acrylate oligomers, the (meth)acrylate monomer, and the zirconia particles. Within this range, the protective film can exhibit good properties in terms of impact resistance and scratch resistance and can reduce the radius of curvature to improve foldability in cooperation with the first base layer. Preferably, the first urethane (meth)acrylate oligomer is present in an amount of about 20 to about 50 parts by weight, about 25 to about 50 parts by weight, about 25 to about 45 parts by weight, or about 30 to about 45 parts by weight, and the second urethane (meth)acrylate oligomer may be present in an amount of about 40 to about 65 parts by weight, or about 40 to about 60 parts by weight. Within this range, even with a thin hard coating layer, the protective film can secure good properties in terms of impact resistance, scratch resistance, and foldability.

Herein, the term "in terms of solid content" means the total amount of components of the hard coating composition excluding the amount of a solvent.

The first urethane (meth)acrylate oligomer and second urethane (meth)acrylate oligomer are cured by the initiator to form a matrix of the hard coating layer and can improve impact resistance, scratch resistance and flexibility of the protective film in cooperation with the zirconia particles. The hard coating composition includes the first (meth)acrylate oligomer, which has a large number of functional groups and low elongation despite a lower weight average molecular weight than the second urethane (meth)acrylate oligomer, thereby improving impact resistance, scratch resistance and flexibility of the protective film, which includes the hard coating layer 120 on the first base layer 110. The second urethane (meth)acrylate oligomer is a soft component, whereas the first urethane (meth)acrylate oligomer is a hard component. Specifically, the protective film 100 has a radius of curvature of about 3 mm or less, for example, about 0 mm to about 3 mm. Particularly, the protective film 100 may have a radius of curvature of about 3 mm or less, for example, about 0 mm to about 3 mm, upon folding of the protective film in a direction of the hard coating layer 120. The protective film 100 may have a radius of curvature of about 5 mm or less, about 3 mm or less, for example, about 0 mm or more to about 5 mm or less, or about 0 mm or more to about 3 mm or less, upon folding of the protective film in the direction of the first base 110.

The first urethane (meth)acrylate oligomer is a hepta-functional to deca-functional (meth)acrylate compound, and may have a weight average molecular weight of about 1,000 g/mol or more to less than about 4,000 g/mol, for example, about 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900 g/mol, and an elongation of about 1% to less than about 15%, for example, about 1%, about 2%, about 3%, about 4%, about 5%, about 6%, about 7%, about 8%, about 9%, about 10%, about 11%, about 12%, about 13%, or about 14%. Within these ranges, the protective film can have good properties in terms of impact resistance, scratch resistance, and flexibility. Preferably, the first urethane (meth)acrylate oligomer is a nona-functional to deca-functional (meth)acrylate compound and has a weight average molecular weight of about 1,500 g/mol to about 2,500 g/mol and an elongation of about 5% to about 10%. Within these ranges, even with a thin hard coating layer, the protective film can secure good properties in terms of impact resistance, scratch resistance, and foldability while further improving wear resistance thereof.

The second urethane (meth)acrylate oligomer is a tetra-functional to hexa-functional (meth)acrylate compound, and may have a weight average molecular weight of about 4,000 g/mol to about 8,000 g/mol, for example, about 4100, 4200, 4300, 4400, 4500, 4700, 4800, 4900, 5000, 5100, 5200, 5300, 5400, 5500, 5600, 5700, 5800, 5900, 6000, 6100, 6200, 6300, 6400, 6500, 6900, 7000, 7100, 7200, 7300, 7400, 7500, 7600, 7700, 7800, 7900 g/mol, and an elongation of about 15% or more to about 25% or less, for example, about 15%, about 16%, about 17%, about 18%, about 19%, about 20%, about 21%, about 22%, about 23%, about 24%, or about 25%. Within these ranges, the protective film can have good properties in terms of impact resistance, scratch resistance, and flexibility. Preferably, the second urethane (meth)acrylate oligomer is a penta-functional to hexa-functional (meth)acrylate compound, and has a weight average molecular weight of about 4,000 g/mol to about 6,000 g/mol and an elongation of about 15% or more to about 20% or less. Within these ranges, even with a thin hard coating layer, the protective film can secure good properties in terms of impact resistance, scratch resistance, and foldability while further improving stretching effects of the protective film.

As compared with the amount of the first urethane (meth)acrylate oligomer, the second urethane (meth)acrylate oligomer may be present in below amount. As a result, the first urethane (meth)acrylate oligomer and second urethane (meth)acrylate oligomer can improve impact resistance, scratch resistance and flexibility of the protective film in cooperation with the zirconia particles. Specifically, the second urethane (meth)acrylate oligomer may be present in an amount of about 80% to about 300% of the amount of the first urethane (meth)acrylate oligomer, for example, about 80, 90, 100, 110, 120, 130, 140, 150, 160, 170, 180, 190, 200, 210, 220, 230, 240, 250, 260, 270, 280, 290, 300%. Within this range, even with a thin hard coating layer, the protective film can secure good properties in terms of impact resistance, scratch resistance, and foldability while further improving stretching effects of the protective film.

Each of the first urethane (meth)acrylate oligomer and second urethane (meth)acrylate oligomer may be prepared through polymerization of a polyfunctional polyol, a polyfunctional isocyanate compound, and a hydroxyl group-containing (meth)acrylate compound. The polyfunctional polyol may include the aforementioned polyfunctional polyol and the polyfunctional isocyanate compound may include the aforementioned polyfunctional isocyanate. The hydroxyl group-containing (meth)acrylate compound may include hydroxyethyl (meth)acrylate, pentaerythritol tri(meth)acrylate, dipentaerythritol penta(meth)acrylate, hydroxypropyl (meth)acrylate, hydroxybutyl (meth)acrylate, chlorohydroxypropyl (meth)acrylate, and hydroxyhexyl (meth)acrylate, without being limited thereto.

The (meth)acrylate monomer is a bi-functional to hexa-functional (meth)acrylate monomer and can be cured together with the first and second urethane (meth)acrylate oligomers, thereby improving hardness of the protective film. The (meth)acrylate monomer may include bifunctional acrylates such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentylglycol-modified trimethylpropane di(meth)acrylate, adamantane di(meth)acrylate, and 9,9-bis[4-(2-acryloyloxyethoxy)phenyl] fluorene; trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, ethylene oxide-modified trimethylolpropane tri(meth)acrylate, propylene oxide-modified trimethylolpropane tri(meth)acrylate, and tris(meth)acryloxyethyl isocyanurate; tetrafunctional acrylates such as diglycerin tetra(meth)acrylate and pentaerythritol tetra(meth)acrylate; pentafunctional acrylates such as dipentaerythritol penta(meth)acrylate; and hexafunctional acrylates such as dipentaerythritol hexa(meth)acrylate, and caprolactone-modified dipentaerythritol hexa(meth)acrylate, without being limited thereto. Preferably, the (meth)acrylate monomer is a tri- to penta-functional (meth)acrylate monomer and can provide improvement in impact resistance and scratch resistance through crosslinking density.

The (meth)acrylate monomer may be present in an amount of about 1 part by weight to about 30 parts by weight, for example, about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight, specifically about 5 parts by weight to about 20 parts by weight, or about 5 parts by weight to about 15 parts by weight, of the total amount of 100 parts by weight of the first urethane (meth)acrylate oligomer, the second urethane (meth)acrylate oligomer, the (meth)acrylate monomer, and the zirconia particles. Within this range, even with a thin hard coating layer, the protective film can secure good properties in terms of impact resistance, scratch resistance, and foldability.

The zirconia particles can improve scratch resistance of the hard coating layer in cooperation with the first and second urethane (meth)acrylate oligomers. When silica particles are used instead of the zirconia particles, there is a problem of deterioration in scratch resistance upon combination with the first and second urethane (meth)acrylate oligomers. The zirconia particles may have an average particle diameter (D50) of about 200 nm or less, for example, about 5, 10, 20, 30, 40, 50, 60, 70, 80, 90, 100, 110, 120, 130, 140, 150, 160, 170, 180, 190, 200 nm, specifically about 100 nm or less, more specifically about 5 nm to about 100 nm. Within this range, the zirconia particles can improve scratch resistance of the protective film without increasing haze of the hard coating layer.

Although the zirconia particles can be used without surface treatment, the zirconia particles subjected to surface treatment with a (meth)acrylate compound has good dispersion with the first urethane (meth)acrylate oligomer, the second urethane (meth)acrylate oligomer, and the (meth)acrylate monomer, thereby reducing haze of the protective film.

The zirconia particles may be present in an amount of about 0.01 parts by weight to about 10 parts by weight, for example, about 0.01, 1, 2, 3, 4, 5, 6, 7, 8, 9, or 10 parts by weight, for example, about 1 part by weight to about 4 parts by weight, of the total amount of 100 parts by weight of the first urethane (meth)acrylate oligomer, the second urethane (meth)acrylate oligomer, the (meth)acrylate monomer, and the zirconia particles. Within this range, even with a thin hard coating layer, the protective film can secure good properties in terms of impact resistance, scratch resistance, and foldability.

The initiator may include a photo-radical initiator. The initiator may include an acetophenone compound, a benzyl ketal type compound, or a mixture thereof, without being limited thereto. Preferably, the acetophenone compound includes 2,2-dimethoxy-2-phenylacetophenone, 2,2'-diethoxyacetophenone, 2,2'-dibuthoxyacetophenone, 2-hydroxy-2-methylpropiophenone, p-t-butyltrichloroacetophenone, p-t-butyldichloroacetophenone, 4-chloroacetophenone, 2,2'-dichloro-4-phenoxyacetophenone, 2-methyl-1-(4-methylthiophenyl)-2-morpholinopropane-1-one, 2-benzyl-2-dimethyl amino-1-(4-morpholinophenyl)-butane-1-one, and mixtures thereof.

The initiator may be present in an amount of about 0.01 parts by weight to about 10 parts by weight, specifically about 1 part by weight to about 5 parts by weight, based on the total amount of 100 parts by weight of the first urethane (meth)acrylate oligomer, the second urethane (meth)acrylate oligomer, the (meth)acrylate monomer, and the zirconia particles. Within this range, the initiator can achieve complete curing reaction, prevent deterioration in transmittance due to remaining initiator, suppress generation of bubbles, and exhibit good reactivity.

The silicon-based additive serves to improve surface characteristics of the hard coating layer and may include a typical silicon-based additive known to those skilled in the art. For example, the silicon-based additive may include polyether-modified acrylic polydimethylsiloxane, without being limited thereto.

The silicon-based additive may be present in an amount of about 0.01 parts by weight to about 5 parts by weight, specifically about 0.1 parts by weight to about 2 parts by weight, or about 0.1 parts by weight to about 1 parts by weight, based on the total amount of 100 parts by weight of the first urethane (meth)acrylate oligomer, the second urethane (meth)acrylate oligomer, the (meth)acrylate monomer, and the zirconia particles. Within this range, the silicon-based additive can improve surface characteristics of the hard coating layer without affecting other components of the composition.

The fluorine-based additive serves to improve surface characteristics of the hard coating layer and may include a typical fluorine-based additive known to those skilled in the art.

The fluorine-based additive may be present in an amount of about 0.01 parts by weight to about 5 parts by weight, specifically about 0.1 parts by weight to about 2 parts by weight, based on the total amount of 100 parts by weight of the first urethane (meth)acrylate oligomer, the second urethane (meth)acrylate oligomer, the (meth)acrylate monomer, and the zirconia particles. Within this range, the fluorine-based additive can improve surface characteristics of the hard coating layer without affecting other components of the composition.

The hard coating composition may further include a solvent to facilitate coating of the hard coating composition. The solvent may include methylethylketone or methyl isobutyl ketone, without being limited thereto. The hard coating composition may further include typical additives known to those skilled in the art in order to impart additional functions to the hard coating layer. The additives may include an antioxidant, a stabilizer, a surfactant, a pigment, an antistatic agent, and a leveling agent, without being limited thereto.

The protective film 100 may have a thickness of about 400 μm or less, specifically about 150 μm to about 400 μm. Within this range, the protective film can be used in an optical display. The protective film 100 may have a total transmittance of about 90% or more, for example, about 90% to about 99%, and a haze of about 1% or less, for example, about 0% to about 1%, and a yellow index (YI) of about 1 or less, for example, about 0 to about 1, in the visible light range, for example, in a wavelength range of 380 nm to 780 nm. Within this range, the protective film can be used in the optical display.

Although not shown in FIG. 1, the protective film may further include a functional layer on the hard coating layer to provide an additional function to the protective film. For example, the functional layer can provide at least one of anti-reflection, low reflection, anti-glare, anti-finger, anti-contamination, diffusion, and refraction functions.

The functional layer may be formed on the hard coating layer 120 by depositing a functional layer composition on the hard coating layer 120 or by mounting the functional layer composition thereon via a bonding layer or an adhesive layer. In another embodiment, the hard coating layer 120 may be formed such that one surface of the hard coating layer acts as a functional layer.

Next, a protective film according to another embodiment of the present invention will be described.

The protective film according to this embodiment includes a first base layer and a hard coating layer formed on the first base layer, in which the first base layer is formed of a thermoplastic polyurethane, the hard coating layer has a thickness of 3 μm to less than 20 μm, and the protective film may have an indentation modulus of about 0.3 GPa to less than about 1.5 GPa, as measured on the hard coating layer using a nano-indenter. Within this range, the protective film exhibits good properties in terms of foldability and scratch resistance. The protective film may have an indentation hardness of about 0.1 GPa to less than about 0.3 GPa. Within this range, the protective film exhibits good properties in terms of foldability and scratch resistance, and can be used as a protective film. Since the protective film is disposed at the outermost side of an optical display, the protective film is required to exhibit scratch resistance. Preferably, the protective film may have an indentation modulus of about 0.4 GPa to less than about 1.0 GPa, more preferably about 0.4 GPa to about 0.9 GPa, and an indentation hardness of about 0.15 GPa to less than about 0.3 GPa, preferably about 0.15 GPa to about 0.29 GPa, as measured using a nano-intender.

The first base layer is the same as described above.

The hard coating layer may be formed of a hard coating composition that includes a first urethane (meth)acrylate oligomer, a second urethane (meth)acrylate oligomer, a (meth)acrylate monomer, zirconia particles, an initiator, a silicon-based additive, and a fluorine-based additive. Further, in the hard coating composition, the first urethane (meth)acrylate oligomer may be present in an amount of about 25, 26, 27, 28, 29, 30, 31, 32, 33, 34, 35, 36, 37, 38, 39, 40, 41, 42, 43, 44, 45 wt %, based on the total amount of the first urethane (meth)acrylate oligomer and the second urethane (meth)acrylate oligomer in terms of solid content. Within this range, the protective film satisfies requirements for indentation modulus and indentation hardness to improve impact resistance and scratch resistance while improving scratch resistance and foldability. Preferably, the first urethane (meth)acrylate oligomer is present in an amount of about 26 wt % to about 44 wt %, based on the total amount of the first urethane (meth)acrylate oligomer and the second urethane (meth)acrylate oligomer.

The first urethane (meth)acrylate oligomer, the (meth)acrylate monomer and the zirconia particles may be present of a total amount of about 30 parts by weight or more to about 50 parts by weight or less, of the total amount of 100 parts by weight of the first urethane (meth)acrylate oligomer, the second urethane (meth)acrylate oligomer, the (meth)acrylate monomer, and the zirconia particles. Within this range, the protective film can exhibit good properties in terms of scratch resistance and foldability. Preferably, the first urethane (meth)acrylate oligomer, the (meth)acrylate monomer and the zirconia particles are present of a total amount of about 35 parts by weight or more to about 50 parts by weight or less.

Details of the first urethane (meth)acrylate oligomer, the second urethane (meth)acrylate oligomer, the (meth)acrylate monomer, the zirconia particles, the initiator, the silicon-based additive and the fluorine-based additive are the same as those described above.

In one embodiment, in the hard coating composition, the first urethane (meth)acrylate oligomer may be present in an amount of about 10 parts by weight to about 50 parts by weight; the second urethane (meth)acrylate oligomer may be present in an amount of about 40 parts by weight to about 80 parts by weight; the (meth)acrylate monomer may be present in an amount of about 1 part by weight to about 30 parts by weight; the zirconia particles may be present in an amount of about 0.01 parts by weight to about 10 parts by weight, of the total amount of 100 parts by weight of the first urethane (meth)acrylate oligomer, the second urethane (meth)acrylate oligomer, the (meth)acrylate monomer, and the zirconia particles; the initiator may be present in an amount of about 0.01 parts by weight to about 10 parts by weight; the silicon-based additive may be present in an amount of about 0.01 parts by weight to about 5 parts by weight; and the fluorine-based additive may be present in an amount of about 0.01 parts by weight to about 5 parts by weight, based on the total amount of 100 parts by weight of the first urethane (meth)acrylate oligomer, the second urethane (meth)acrylate oligomer, the (meth)acrylate monomer, and the zirconia particles.

Next, a protective film according to another embodiment of the present invention will be described with reference to FIG. 2. FIG. 2 is a cross-sectional view of a protective film according to another embodiment of the present invention.

Referring to FIG. 2, a protective film 200 according to this embodiment is substantially the same as the protective film 100 according to the above embodiment except that a connection layer 111 and a second base layer 112 are sequentially stacked from the first base layer 110 between the first base layer 110 and the hard coating layer 120. With the structure wherein the first base layer 110, the connection layer 111, and the second base layer 112 are sequentially stacked in the stated order, the protective film can have further improved impact resistance.

The first base layer 110, the connection layer 111, and the second base layer 112 are sequentially stacked in the stated order and directly formed one above another. The second base layer 112 may be a coating layer or a film, which is formed of the same or different thermoplastic polyurethane than the first base layer 110, and may have the same or different thickness than the first base layer 110. The connection layer 111 may be an adhesive/bonding layer that attaches the first base layer 110 to the second base layer 112. However, when any one of the first base layer 110 and the second base layer 112 exhibits adhesiveness, the connection layer 111 can be omitted.

Next, a protective film according to a further embodiment of the present invention will be described with reference to FIG. 3. FIG. 3 is a cross-sectional view of a protective film according to a further embodiment of the present invention.

Referring to FIG. 3, a protective film 300 according to this embodiment is substantially the same as the protective film 100 according to the above embodiment except that an adhesive layer 130 is further formed on a lower surface of the first base layer 110. The adhesive layer 130 allows the protective film 300 to be attached to a window film or various optical elements, for example, a polarizing plate, disposed under the window film, while improving foldability of the protective film.

The adhesive layer 130 may be formed of an adhesive composition that includes a monomer mixture for a hydroxyl group-containing (meth)acrylic copolymer; an initiator; and organic nanoparticles.

The monomer mixture may include a hydroxyl group-containing (meth)acrylate and at least one of an alkyl group-containing (meth)acrylate, an ethylene oxide-containing monomer, a propylene oxide-containing monomer, an amine group-containing monomer, an alkoxy group-containing monomer, a phosphoric acid group-containing monomer, an sulfonic acid group-containing monomer, a phenyl group-containing monomer, a silane group-containing monomer, a carboxylic acid group-containing monomer, and an amide group-containing (meth)acrylate. The hydroxyl group-containing (meth)acrylate may include at least one of 2-hydroxyethyl (meth)acrylate, 2-hydroxypropyl (meth)acrylate, 3-hydroxypropyl(meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxy-3-phenyloxypropyl(meth)acrylate, 4-hydroxycyclopentyl (meth)acrylate, 4-hydroxycyclohexyl (meth)acrylate, and cyclohexanedimethanol mono (meth)acrylate. The alkyl group-containing (meth)acrylate may include an unsubstituted $C_1$ to $C_{20}$ linear or branched alkyl (meth)acrylic acid ester. For example, the alkyl group-containing (meth)acrylate may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, iso-octyl (meth)acrylate, nonyl (meth)acrylate, decyl (meth)acrylate, lauryl (meth)acrylate, and isobornyl (meth)acrylate. Preferably, the hydroxyl group-containing (meth)acrylate may be present in an amount of about 5 wt % to about 40 wt %, specifically about 10 wt % to about 30 wt %, and the alkyl group-containing (meth)acrylate may be present in an amount of about 60 wt % to about 95 wt %, specifically about 70 wt % to about 90 wt %, in the monomer mixture.

The organic nanoparticles can prevent the adhesive layer from suffering from delamination, slight lifting and/or bubble generation at high temperature by improving modulus of the adhesive layer at high temperature, thereby improving reliability. The organic nanoparticles have a high glass transition temperature to improve modulus of the adhesive layer at high temperature.

The organic nanoparticles may have an average particle diameter of about 10 nm to about 400 nm, specifically about 10 nm to about 300 nm, more specifically about 30 nm to about 280 nm, still more specifically about 50 nm to about 280 nm. Within this range, the organic nanoparticles do not affect foldability of the adhesive layer and can secure a total transmittance of 90% or more in the visible range, thereby providing good transparency to the adhesive layer. The organic nanoparticles may have a core-shell structure or a simple structure such as bead type nanoparticles, without being limited thereto. In one embodiment, the organic nanoparticles may have a core-shell structure, in which the core and the shell satisfy Equation 2. That is, both the core and shell of the nanoparticles may be formed of organic materials. With this structure, the organic nanoparticles can improve foldability of the adhesive layer and can provide good effects on balance between viscoelasticity and flexibility.

$$Tg(c)<Tg(s) \quad \quad \text{<Equation 2>}$$

(In Equation 2, wherein Tg(c) is the glass transition temperature (unit: ° C.) of the core and Tg(s) is the glass transition temperature (unit: ° C.) of the shell).

The core may have a glass transition temperature of about −150° C. to about 10° C., specifically about −150° C. to about −5° C., more specifically about −150° C. to about −20° C. Within this range, the adhesive layer can exhibit good viscoelasticity at low temperature and/or room temperature. The core may include at least one of a poly(alkyl (meth) acrylate), a polysiloxane and a polybutadiene each having a glass transition temperature within this range. The poly (alkyl (meth)acrylate) includes at least one of poly(methyl acrylate), poly(ethyl acrylate), poly(propyl acrylate), poly (butyl acrylate), poly(isopropyl acrylate), poly(hexyl acrylate), poly(hexyl methacrylate), poly(ethylhexyl acrylate), and poly(ethylhexyl methacrylate), without being limited thereto.

The shell may have a glass transition temperature of about 15° C. to about 150° C., specifically about 35° C. to about 150° C., more specifically about 50° C. to about 140° C. Within this range, the organic nanoparticles can exhibit good dispersion in the (meth)acrylic copolymer. The shell may include a poly(alkyl methacrylate) having a glass transition temperature within this range. For example, the shell may include at least one of poly(methyl methacrylate) (PMMA), poly(ethyl methacrylate), poly(propyl methacrylate), poly (butyl methacrylate), poly(isopropyl methacrylate), poly (isobutyl methacrylate), and poly(cyclohexyl methacrylate), without being limited thereto.

The core may be present in an amount of about 30 wt % to about 99 wt %, specifically about 40 wt % to about 95 wt %, more specifically about 50 wt % to about 90 wt %, in the organic nanoparticles. Within this range of the core, the adhesive layer can exhibit good foldability in a wide temperature range. The shell may be present in an amount of about 1 wt % to about 70 wt %, specifically about 5 wt % to about 60 wt %, more specifically about 10 wt % to about 50 wt %, in the organic nanoparticles. Within this range of the core, the adhesive layer can exhibit good foldability in a wide temperature range.

The organic nanoparticles may be present in an amount of about 0.1 parts by weight to about 20 parts by weight, specifically about 0.5 parts by weight to about 10 parts by weight, more specifically about 0.5 parts by weight to about 8 parts by weight, based on the total amount of 100 parts by weight of the hydroxyl group-containing (meth)acrylate and the alkyl group-containing (meth)acrylate. Within this range, the organic nanoparticles can improve properties of the adhesive layer in terms of modulus at high temperature, foldability at room temperature and high temperature, and viscoelasticity at low temperature and/or room temperature.

The initiator is the same as described above.

The adhesive composition may further include a crosslinking agent and a silane coupling agent, details of which are the same as those known to those skilled in the art.

An optical member according to the present invention may include the protective film according to the present invention.

In one embodiment, the optical member may include a window film and a protective film formed on the window film, in which the protective film may include the protective film according to the embodiments of the present invention. The window film may include a base layer and a window coating layer formed of a silicone resin in order to secure foldability, without being limited thereto.

Next, an optical display according to one embodiment of the present invention will be described with reference to FIG. 4. FIG. 4 is a sectional view of an optical display according to one embodiment of the present invention.

Referring to FIG. 4, a flexible optical display 400 according to one embodiment of the invention includes a display part 410, a polarizing plate 420, a touchscreen panel 430, a window film 440, and a protective film 450, in which the protective film 450 may include the protective film according to the embodiments of the present invention.

The display part 410 serves to drive the flexible optical display 400, and may include a substrate and an optical device including an OLED, an LED, a QLED (quantum dot light emitting diode), or an LCD element formed on the substrate. Although not shown in FIG. 4, the display part 410 may include a lower substrate, a thin film transistor, an organic light emitting diode, a flattening layer, a protective layer, and an insulating layer.

The polarizing plate 420 can realize polarization of internal light or prevent reflection of external light to realize a display, or can increase contrast of the display. The polarizing plate may be composed of a polarizer alone. Alternatively, the polarizing plate may include a polarizer and a protective film formed on one or both surfaces of the polarizer. Alternatively, the polarizing plate may include a polarizer and a protective coating layer formed on one or both surfaces of the polarizer. As the polarizer, the protective film and the protective coating layer, a typical polarizer, a typical protective film and a typical protective coating layer known in the art may be used.

The touchscreen panel 430 generates electrical signals through detection of variation in capacitance when a human body or a conductor such as a stylus touches the touchscreen panel 430, and the display part 410 may be driven by such electrical signals. The touchscreen panel 430 is formed by patterning a flexible conductor, and may include first sensor electrodes and second sensor electrodes each formed between the first sensor electrodes and intersecting the first sensor electrodes. The touchscreen panel 430 may include a conductive material such as metal nanowires, conductive polymers, and carbon nanotubes, without being limited thereto.

The window film 440 is disposed on an outer surface of the flexible optical display 400 to protect the flexible optical display. The window film 440 may be composed of a window coating layer alone or may be a film including a base layer and a window coating layer formed on the base layer. The base layer may be a film formed of an optically transparent resin, such as a polyimide film. The window coating layer may be formed of a composition including a silicone resin, a crosslinking agent, and an initiator.

Although not shown in FIG. 4, adhesive layers may be further formed between the polarizing plate 420 and the touchscreen panel 430 and/or between the touchscreen panel 430 and the window film 440 to reinforce coupling between the polarizing plate, the touchscreen panel, and the window film.

Next, an optical display according to another embodiment of the present invention will be described with reference to FIG. 5. FIG. 5 is a sectional view of an optical display according to another embodiment of the present invention.

Referring to FIG. 5, a flexible optical display 500 according to another embodiment includes a display part 410, a polarizing plate 420, a touchscreen panel 430, a window film 440', and a protective film 450', in which the window film 440' may include the protective film according to the embodiments of the present invention.

The protective film 450' may include a typical protective film for window films. In some embodiments, the protective film 450' may include a protective film according to one embodiment of the invention.

Although the flexible optical displays according to the embodiments of the present invention are described above, it should be understood that the present invention may also be applied to a non-flexible display.

Next, the present invention will be described in detail with reference to some examples. However, it should be understood that these examples are provided for illustration only and are not to be construed in any way as limiting the present invention.

Details of each composition for protective films used in Examples 1 to 11 and Comparative Example 1 to 12 are as follows.

(A) First urethane (meth)acrylate resin: UA11064 (Manufacturer: Entis, deca-functional (meth)acrylate, weight average molecular weight: 2,000 g/mol, elongation: 6%, solid content: 100%)

(B) Second urethane (meth)acrylate resin: CHTF-9696AN (Manufacturer: Chemton, hexa-functional (meth)acrylate, weight average molecular weight: 4,500 g/mol, elongation: 16%, solid content 83%)

(C) (Meth)acrylate monomer: SR499 (Manufacturer: Sartomer, trifunctional (meth)acrylate, solid content 100%)

(D) Zirconia particles: SZK330A (Manufacturer: Ranco, average particle diameter (D50): 20 nm to 50 nm, solid content 30%)

(E) Silicon-based additive: BYK-3500 (Manufacturer: BYK, solid content 10%)

(F) Fluorine-based additive: RS-78 (Manufacturer: DIC, solid content 10%)

(G) Initiator: Irgacure 184 (Manufacturer: BASF, solid content 25%)

(H) Solvent: Methylethylketone (Manufacturer: Samchun Chemicals)

(I) Silica particles: SSI330U (Manufacturer: Ranco, average particle diameter (D50): 20 nm to 50 nm)

*Elongation of the first and second urethane (meth)acrylate resins was measured by an Instron measurement method.

Example 1

In terms of solid content, 30 parts by weight of the first urethane (meth)acrylate resin, 60 parts by weight of the second urethane (meth)acrylate resin, 7 parts by weight of the (meth)acrylate monomer, 3 parts by weight of zirconia particles, 0.1 parts by weight of the silicon-based additive, 0.4 parts by weight of the fluorine-based additive, and 2.5 parts by weight of the initiator were mixed with 50 parts by weight of methylethylketone as a solvent, thereby preparing a hard coating composition.

The prepared hard coating composition was coated onto one surface of thermoplastic polyurethane (TPU) film (thickness: 150 μm, Shore hardness: 98 A, ΔE: 1.0 as calculated by Equation 1, Manufacturer: Sheedom Co., Ltd.) as a base layer, dried at 80° C. for 2 minutes, followed by irradiation at a dose of 300 mJ/cm² using a metal halide lamp under a nitrogen purging condition, thereby forming a 5 μm thick hard coating layer.

A protective film was prepared by forming an adhesive layer (thickness: 30 μm) on the other surface of the thermoplastic polyurethane film. The adhesive layer was formed of an acrylic adhesive.

Example 2 to Example 7

Each of protective films was prepared in the same manner as in Example 1 except that the thicknesses of the thermoplastic polyurethane film and the hard coating layer were changed as listed in Table 1.

Example 8

A protective film was prepared in the same manner as in Example 1 except that the components of the hard coating composition were changed as listed in Table 2.

Comparative Examples 1 to 3

Each of protective films was prepared in the same manner as in Example 1 except that the thicknesses of the thermoplastic polyurethane film and the hard coating layer were changed as listed in Table 1.

Comparative Example 4

A protective film was prepared in the same manner as in Example 1 except that a polyethylene terephthalate (PET) film (Toray Co., Ltd., thickness: 100 μm) was used instead of the thermoplastic polyurethane film.

Comparative Example 5

A protective film was prepared in the same manner as in Example 1 except that a polycarbonate (PC) film (I-component Co., Ltd., thickness: 300 μm) was used instead of the thermoplastic polyurethane film.

Comparative Examples 6 to 12

Each protective film was prepared in the same manner as in Example 1 except that the components of the hard coating composition were changed as listed in Table 2.

Each of the protective films prepared in Examples 1 to 8 and Comparative Examples 1 to 12 was evaluated as to the following properties and evaluation results are shown in Tables 1 and 3.

(1) Haze: Haze was measured using an NDH-9600 (Nippon Denshoku Co., Ltd.) by placing each of the protective films of Examples and Comparative Examples in the instrument such that the hard coating layer faced a light source.

(2) Total transmittance and yellow index (YI): Each of total transmittance and yellow index was measured using a CM-3600A (Konica Minolta Co., Ltd.) by placing each of the protective films of Examples and Comparative Examples in the instrument such that the hard coating layer faced a light source.

(3) Scratch resistance: A specimen was prepared by stacking a polyethylene terephthalate film (thickness: 75 μm) on a lower surface of the adhesive layer of each of the protective films of Examples and Comparative Examples. With the prepared specimen secured to a surface property tester (Heidon Co., Ltd.) and a piece of #0000 steel wool mounted thereon, a weight of 1.5 kg was applied and reciprocated 10 times by a distance of 50 mm on the surface of the hard coating layer, followed by counting the number of scratches. The number of scratches is inversely proportional to scratch resistance. A specimen having two or fewer scratches was evaluated as having high scratch resistance and means that the corresponding protective film can be used.

(4) Pen drop impact resistance: A specimen was prepared by stacking a polyethylene terephthalate film (thickness: 125 μm) on a lower surface of the adhesive layer of each of the protective films of Examples and Comparative Examples. For each of the prepared specimens, a ball-point pen (Manufacturer: Bic Co., Ltd.) was dropped from a predetermined height on the hard coating layer of the specimen to evaluate a height at which a crack was primarily generated on the surface of the hard coating layer. Generation of cracks was confirmed through an optical microscope. A higher height indicates better pen drop impact resistance. A protective film having a drop height of 5 cm was evaluated as having good impact resistance and could be used.

(5) Foldability: A specimen (length×width, 10 cm×5 cm) was prepared by stacking a polyethylene terephthalate film (thickness: 75 μm) on a lower surface of the adhesive layer of each of the protective films of Examples and Comparative Examples. Each of the specimens prepared at room temperature (25° C.) was evaluated as to an initial radius of curvature at which a crack was generated on a bent portion of the specimen when the specimen was folded in half in a direction of the polyethylene terephthalate film. A lower radius of curvature indicates better foldability. Generation of cracks was confirmed through an optical microscope. In evaluation of folding, a protective film having a radius of curvature of 5 mm or less was allowable.

TABLE 1

| | Base layer | | | Hard coating layer | Optical properties | | | Physical Properties | | |
|---|---|---|---|---|---|---|---|---|---|---|
| No. | Material | Thickness (μm) | Shore hardness | Thickness (μm) | Haze (%) | Total transmittance (%) | YI | Scratch resistance (number) | Pen drop impact resistance (cm) | Folding flexibility (mm) |
| Example 1 | TPU | 150 | 98A | 5 | 0.78 | 91.27 | 0.81 | 1 | 7 | 1 |
| Example 2 | TPU | 150 | 95A | 3 | 0.75 | 91.19 | 0.67 | 1 | 7 | 1 |
| Example 3 | TPU | 150 | 95A | 5 | 0.75 | 91.66 | 0.68 | 1 | 7 | 1 |
| Example 4 | TPU | 150 | 95A | 10 | 0.73 | 91.79 | 0.73 | 2 | 8 | 1 |
| Example 5 | TPU | 150 | 95A | 15 | 0.74 | 91.09 | 0.84 | 2 | 9 | 1 |
| Example 6 | TPU | 200 | 95A | 5 | 0.81 | 91.76 | 0.78 | 1 | 7 | 2 |
| Example 7 | TPU | 200 | 95A | 10 | 0.62 | 91.83 | 0.73 | 1 | 8 | 2 |
| Comparative Example 1 | TPU | 50 | 95A | 5 | 0.76 | 91.76 | 0.84 | 12 | 3 | 1 |
| Comparative Example 2 | TPU | 300 | 95A | 5 | 0.85 | 91.68 | 0.91 | 10 | 6 | 5 |
| Comparative Example 3 | TPU | 150 | 85A | 5 | 0.76 | 91.68 | 0.76 | 8 | 3 | 1 |
| Comparative Example 4 | PET | 100 | — | 5 | 0.67 | 91.08 | 0.70 | 3 | 2 | 5 |
| Comparative Example 5 | PC | 300 | — | 5 | 0.52 | 91.75 | 0.68 | 3 | 2 | 5 |

TABLE 2

| | (A) | (B) | (C) | (D) | (E) | (F) | (G) | (I) |
|---|---|---|---|---|---|---|---|---|
| Example 1 | 30 | 60 | 7 | 3 | 0.1 | 0.4 | 2.5 | — |
| Example 8 | 45 | 40 | 12 | 3 | 0.1 | 0.4 | 2.5 | — |
| Comparative Example 6 | 60 | 20 | 17 | 3 | 0.1 | 0.4 | 2.5 | — |
| Comparative Example 7 | 33 | 60 | 7 | 0 | 0.1 | 0.4 | 2.5 | — |
| Comparative Example 8 | 30 | 60 | 7 | 3 | 0 | 0 | 2.5 | — |
| Comparative Example 9 | 30 | 60 | 7 | 3 | 0.4 | 0 | 2.5 | — |
| Comparative Example 10 | 30 | 60 | 7 | 3 | 0 | 0.4 | 2.5 | — |
| Comparative Example 11 | 7 | 60 | 30 | 3 | 0.1 | 0.4 | 2.5 | — |
| Comparative Example 12 | 30 | 60 | 7 | 0 | 0.1 | 0.4 | 2.5 | 3 |

TABLE 3

| | Optical properties | | | Physical Properties | | |
|---|---|---|---|---|---|---|
| No. | Haze (%) | Total-transmittance (%) | YI | Scratch resistance (number) | Pen drop impact resistance (cm) | Folding flexibility (mm) |
| Example 1 | 0.76 | 91.93 | 0.74 | 2 | 7 | 1 |
| Example 8 | 0.78 | 91.90 | 0.76 | 1 | 5 | 3 |
| Comparative Example 6 | 0.70 | 91.91 | 0.74 | 0 | 3 | 5 |
| Comparative Example 7 | 0.71 | 91.91 | 0.74 | 7 | 8 | 2 |
| Comparative Example 8 | 0.71 | 91.89 | 0.73 | 10 | 5 | 2 |

TABLE 3-continued

| | Optical properties | | | Physical Properties | | |
|---|---|---|---|---|---|---|
| No. | Haze (%) | Total-transmittance (%) | YI | Scratch resistance (number) | Pen drop impact resistance (cm) | Folding flexibility (mm) |
| Comparative Example 9 | 0.69 | 91.93 | 0.74 | 5 | 6 | 2 |
| Comparative Example 10 | 0.72 | 91.99 | 0.72 | 5 | 6 | 2 |
| Comparative Example 11 | 0.77 | 91.92 | 0.77 | 7 | 7 | 2 |
| Comparative Example 12 | 0.76 | 91.93 | 0.74 | 5 | 7 | 1 |

As shown in Tables 1 to 3, the protective films of Examples had good properties in terms of foldability, flexibility, scratch resistance, and impact resistance. Even with a thin hard coating layer, the protective films of Examples exhibited good properties in terms of scratch resistance, impact resistance, and folding characteristics.

Examples 9 to 11

Each of protective films was prepared in the same manner as in Example 1 except that the components of the hard coating composition were changed as listed in Table 4.

Each of the protective films prepared in Example 9 to Example 11 was evaluated as to the following properties and evaluation results are shown in Table 5.

(6) Indentation modulus and indentation hardness: For each of the protective films of Examples 9 to 11 (thickness of first base layer: 150 μm, thickness of hard coating layer: 5 μm), indentation modulus and indentation hardness were measured by applying a force of 10 mN to a portion (unit area: 1 mm$^2$) of the hard coating layer using a nano-indentor (Vickers indenter) of a nano-indentation instrument (TI750 Ubi, Hysitron Co., Ltd.) under conditions of 25° C. and 55% RH for 5 seconds, followed by creeping for 2 seconds and relaxation for 5 seconds.

Haze, total transmittance, yellow index, foldability, and scratch resistance were measured by the same methods as in Tables 1 and 3.

TABLE 4

| | (A) | (B) | (C) | (D) | (E) | (F) | (G) |
|---|---|---|---|---|---|---|---|
| Example 9 | 37.6 | 50.0 | 9.4 | 3.0 | 0.1 | 0.05 | 3 |
| Example 10 | 29.6 | 60.0 | 7.4 | 3.0 | 0.1 | 0.05 | 3 |
| Example 11 | 25.6 | 65.0 | 6.4 | 3.0 | 0.1 | 0.05 | 3 |

TABLE 5

| | Ratio 1 of (A) content | Indentation modulus (GPa) | Indentation hardness (GPa) | Haze (%) | Total transmittance (%) | YI | Foldability (mm) | Scratch resistance (number) |
|---|---|---|---|---|---|---|---|---|
| Example 9 | 43% | 0.703 | 0.224 | 0.97 | 91.89 | 0.72 | 2 | 0 |
| Example 10 | 33% | 0.564 | 0.187 | 0.98 | 91.90 | 0.76 | 1 | 1 |
| Example 11 | 28% | 0.449 | 0.152 | 0.96 | 91.93 | 0.74 | 1 | 1 |

*1: percent by weight (wt %) of (A) based on the total amount of (A) and (B).

As shown in Table 5, the protective films of Examples exhibited good properties in terms of scratch resistance and foldability. Furthermore, the protective films of Examples had good optical properties in terms of haze and total transmittance.

It should be understood that the embodiments described above are provided for illustration only and that different embodiments may be applied in combination.

The invention claimed is:

1. A protective film for optical displays, comprising:
a first base layer;
a hard coating layer formed on the first base layer, and
an adhesive layer formed on a lower surface of the first base layer,
wherein the first base layer is formed of a thermoplastic polyurethane and the first base layer has a thickness of 100 μm or more to 200 μm or less and a Shore hardness of 95 A to 98 A,
wherein the protective film has an indentation modulus of about 0.3 Gpa or more to less than about 1.5 GPa and an indentation hardness of about 0.1 GPa or more to less than about 0.3 GPa, as measured on the hard coating layer thereof utilizing a nano-indenter,
wherein the adhesive layer is formed of an adhesive composition that includes a monomer mixture for a hydroxyl group-containing (meth)acrylic copolymer,
wherein the hard coating layer is formed of a hard coating composition comprising a first urethane (meth)acrylate oligomer, a second urethane (meth)acrylate oligomer, a (meth)acrylate monomer and zirconia particles, the zirconia particles are present in an amount of 1 part by weight to 4 parts by weight of 100 parts by weight of the first urethane (meth)acrylate oligomer, the second urethane (meth)acrylate oligomer, the (meth)acrylate monomer and the zirconia particles, and
a difference in index of refraction between the hard coating layer and the first base layer is 0.01 to 0.2.

2. The protective film for optical displays according to claim 1,
wherein the hard coating composition further comprises an initiator, a silicon-based additive, and a fluorine-based additive.

3. The protective film for optical displays according to claim 2,
wherein the first urethane (meth)acrylate oligomer has different elongation from the second urethane (meth)acrylate oligomer.

4. The protective film for optical displays according to claim 2, wherein the first base layer has a thickness of about 100 μm to about 200 μm.

5. The protective film for optical displays according to claim 2, wherein the first urethane (meth)acrylate oligomer has a weight average molecular weight of about 1,000 g/mol or more to less than about 4,000 g/mol and an elongation of about 1% or more to less than about 15%.

6. The protective film for optical displays according to claim 2, wherein the second urethane (meth)acrylate oligomer has a weight average molecular weight of about 4,000 g/mol or more to about 8,000 g/mol or less and an elongation of about 15% or more to about 25% or less.

7. The protective film for optical displays according to claim 2, wherein the zirconia particles have an average particle diameter (D50) of about 100 nm or less.

8. The protective film for optical displays according to claim 2, wherein the (meth)acrylate monomer is present in an amount of about 1 part by weight to about 30 parts by weight of the total amount of 100 parts by weight of the first urethane (meth)acrylate oligomer, the second urethane (meth)acrylate oligomer, the (meth)acrylate monomer, and the zirconia particles.

9. The protective film for optical displays according to claim 2, wherein, the silicon-based additive is present in an amount of about 0.01 parts by weight to about 5 parts by weight and the fluorine-based additive is present in an amount of about 0.01 parts by weight to about 5 parts by weight, based on the total amount of 100 parts by weight of the first urethane (meth)acrylate oligomer, the second urethane (meth)acrylate oligomer, the (meth)acrylate monomer, and the zirconia particles.

10. The protective film for optical displays according to claim 2,
wherein the first urethane (meth)acrylate oligomer is present in an amount of about 25 wt % or more to about 45 wt % or less, of a total amount of the first urethane (meth)acrylate oligomer and the second urethane (meth)acrylate oligomer.

11. The protective film for optical displays according to claim 2, wherein the first urethane (meth)acrylate oligomer is present in an amount of about 25 wt % or more to about 45 wt % or less, of a total amount of the first urethane (meth)acrylate oligomer and the second urethane (meth)acrylate oligomer.

12. An optical display comprising the protective film for optical displays according to claim 2.

13. The protective film for optical displays according to claim 1, wherein the thermoplastic polyurethane is an aliphatic or alicyclic thermoplastic polyurethane.

14. The protective film for optical displays according to claim 1, wherein the hard coating layer is directly formed on the first base layer.

15. The protective film for optical displays according to claim 1, further comprising: a functional layer formed on an upper surface of the hard coating layer.

16. The protective film for optical displays according to claim 15, wherein the functional layer provides at least one function of anti-reflection, low reflection, anti-glare, anti-fingerprint, anti-contamination, diffusion, and refraction functions.

17. The protective film for optical displays according to claim 1, further comprising: a second base layer between the first base layer and the hard coating layer, the second base layer being formed of a thermoplastic polyurethane.

18. The protective film for optical displays according to claim 1, wherein the protective film has a radius of curvature of about 5 mm or less, when folded in a direction of the first base layer.

19. The protective film for optical displays according to claim 1, wherein the first base layer comprises an optically isotropic film or a retardation film.

20. An optical member comprising the protective film for optical displays according to claim 1.

* * * * *